(12) United States Patent
Masuda

(10) Patent No.: US 11,794,339 B2
(45) Date of Patent: Oct. 24, 2023

(54) ROBOT SYSTEM

(71) Applicant: SEIKO EPSON CORPORATION, Tokyo (JP)

(72) Inventor: Kazuhiro Masuda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 113 days.

(21) Appl. No.: 17/084,676

(22) Filed: Oct. 30, 2020

(65) Prior Publication Data

US 2021/0138638 A1 May 13, 2021

(30) Foreign Application Priority Data

Oct. 31, 2019 (JP) .................... 2019-199280

(51) Int. Cl.
*B25J 9/16* (2006.01)
*B25J 13/08* (2006.01)
*G05B 19/409* (2006.01)

(52) U.S. Cl.
CPC ..... *B25J 9/161* (2013.01); *G05B 2219/39146* (2013.01)

(58) Field of Classification Search
CPC ... B25J 9/161; B25J 13/085; B25J 9/16; B25J 9/1602; B25J 9/1661; B25J 9/1679; B25J 9/1697; B25J 13/087; B25J 13/088; B25J 18/00; G05B 2219/39146; G05B 19/409; G05B 19/414; G05B 19/4188

(Continued)

(56) References Cited

U.S. PATENT DOCUMENTS 5,086,401 A * 2/1992 Glassman ............... A61F 2/46
606/88
5,341,304 A * 8/1994 Sakamoto ........... G05B 19/128
700/110

(Continued)

FOREIGN PATENT DOCUMENTS

EP 2606404 B1 * 4/2014 ............ B25J 9/1602
EP 2958711 B1 * 6/2017 ............. B25J 13/06

(Continued)

OTHER PUBLICATIONS

Search Report of the First Office Action CN Application No. 202011197647X dated Apr. 8, 2023.

*Primary Examiner* — Jaime Figueroa
(74) *Attorney, Agent, or Firm* — Gang Yu

(57) ABSTRACT

A robot system includes a robot including a robot main body having a receiving unit that receives a predetermined operation, a control apparatus that controls actuation of the robot main body, and a transmitting unit that, when the receiving unit receives the operation, transmits information representing reception of the operation, and an instruction apparatus having a receiving unit that receives the information transmitted by the transmitting unit and a first reporting unit, and instructing the control apparatus to execute an operation program, wherein, when the instruction apparatus is in a condition with a right for control in which the instruction apparatus can instruct the control apparatus to execute the operation program, when the receiving unit receives the information, the first reporting unit reports that the instruction apparatus is in the condition with the right for control.

6 Claims, 9 Drawing Sheets

(58) Field of Classification Search
USPC .................. 700/245–264; 318/568.11–568.25
See application file for complete search history.

(56) References Cited

U.S. PATENT DOCUMENTS

| | | | | |
|---|---|---|---|---|
| 5,590,244 | A * | 12/1996 | Nakata | B25J 9/1684 |
| | | | | 318/578 |
| 5,748,854 | A * | 5/1998 | Watanabe | G05B 19/423 |
| | | | | 901/3 |
| 6,386,513 | B1 * | 5/2002 | Kazerooni | B66C 1/0256 |
| | | | | 254/270 |
| 6,622,990 | B2 * | 9/2003 | Kazerooni | B66C 1/0243 |
| | | | | 254/270 |
| 6,886,812 | B2 * | 5/2005 | Kazerooni | B66C 1/0275 |
| | | | | 254/270 |
| 10,350,768 | B2 * | 7/2019 | Takeuchi | B25J 9/1633 |
| 10,423,154 | B2 * | 9/2019 | Iwatake | G05B 19/423 |
| 10,647,003 | B2 * | 5/2020 | Ban | B25J 9/1664 |
| 11,027,429 | B2 * | 6/2021 | Matsumoto | F16P 3/148 |
| 11,104,005 | B2 * | 8/2021 | Park | B25J 13/06 |
| 11,154,985 | B1 * | 10/2021 | Strauss | G05B 19/425 |
| 11,364,636 | B2 * | 6/2022 | Ban | B25J 9/1612 |
| 2001/0021882 | A1 * | 9/2001 | Hosonuma | G06N 3/008 |
| | | | | 700/245 |
| 2002/0100899 | A1 * | 8/2002 | Kazerooni | B66C 1/0256 |
| | | | | 254/270 |
| 2003/0189197 | A1 * | 10/2003 | Kazerooni | B66C 1/0275 |
| | | | | 254/266 |
| 2011/0257787 | A1 * | 10/2011 | Sato | B25J 9/1638 |
| | | | | 700/258 |
| 2013/0158708 | A1 * | 6/2013 | Emmertz | G05B 19/0428 |
| | | | | 700/248 |
| 2013/0345872 | A1 * | 12/2013 | Brooks | B25J 9/1676 |
| | | | | 700/264 |
| 2015/0290810 | A1 * | 10/2015 | Iwatake | B25J 9/1651 |
| | | | | 700/258 |
| 2016/0184996 | A1 * | 6/2016 | Ishige | B25J 9/1692 |
| | | | | 700/254 |
| 2016/0214257 | A1 * | 7/2016 | Sejimo | B25J 9/1674 |
| 2017/0144297 | A1 | 5/2017 | Takaichi et al. | |
| 2017/0266815 | A1 * | 9/2017 | Takeuchi | B25J 13/085 |
| 2018/0071913 | A1 | 3/2018 | Matsudaira et al. | |
| 2018/0200880 | A1 | 7/2018 | Meissner et al. | |
| 2018/0210434 | A1 * | 7/2018 | Iwatake | B25J 9/0081 |
| 2018/0333859 | A1 * | 11/2018 | Ban | B25J 19/023 |
| 2019/0217480 | A1 * | 7/2019 | Park | B25J 13/00 |
| 2020/0086495 | A1 * | 3/2020 | Ban | B25J 9/1612 |

FOREIGN PATENT DOCUMENTS

| | | |
|---|---|---|
| JP | 2005149067 A | 6/2005 |
| JP | 2008080474 A | 4/2008 |
| JP | 2012171029 A | 9/2012 |
| JP | 2015044281 A | 3/2015 |
| JP | 2016007648 A | 1/2016 |
| JP | 2018043307 A | 3/2018 |

\* cited by examiner

ROBOT SYSTEM

The present application is based on, and claims priority from JP Application Serial Number 2019-199280, filed Oct. 31, 2019, the disclosure of which is hereby incorporated by reference herein in its entirety.

BACKGROUND

1. Technical Field

The present disclosure relates to a robot system.

2. Related Art

Recently, in factories, due to labor cost rise and labor shortage, work manually performed in the past has been increasingly automated by various robots and robot peripherals. The various robots have e.g. arms and controllers as control units that control actuation of the arms. Further, in JP-A-2015-44281, a portable operation device is connected to a controller by wireless connection or wired connection and a command of an operation program or the like is input to the controller by the portable operation device.

In some production lines using robots, for example, a plurality of controllers and a plurality of operation devices are mixed in one factory. In this case, to which operation device one controller is connected may be confused. To prevent this, in JP-A-2015-44281, when the operation device transmits a connection destination confirmation operation command, a reporting unit of the connected controller is actuated to report.

However, in JP-A-2015-44281, there is no means for an operator near the robot to confirm to which operation device the controller is connected.

SUMMARY

A robot system according to an application example includes a robot including a robot main body having a receiving unit that receives a predetermined operation, a control apparatus that controls actuation of the robot main body, and a transmitting unit that, when the receiving unit receives the operation, transmits information representing reception of the operation, and an instruction apparatus having a receiving unit that receives the information transmitted by the transmitting unit and a first reporting unit, and instructing the control apparatus to execute an operation program, wherein, when the instruction apparatus is in a condition with a right for control in which the instruction apparatus can instruct the control apparatus to execute the operation program, when the receiving unit receives the information, the first reporting unit reports that the instruction apparatus is in the condition with the right for control.

DESCRIPTION OF EXEMPLARY EMBODIMENTS

As below, a robot system according to the present disclosure will be explained in detail based on preferred embodiments shown in the accompanying drawings.

First Embodiment

Figure 1:
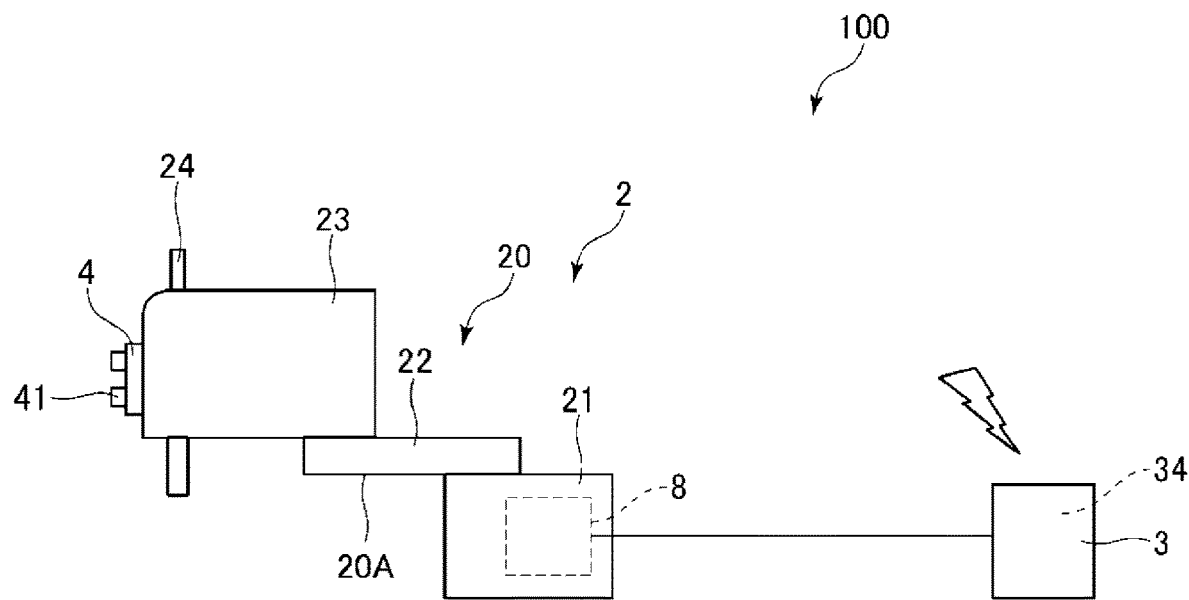
FIG. 1 is a schematic configuration diagram of a first embodiment of a robot system according to the present disclosure.
Figure 1:
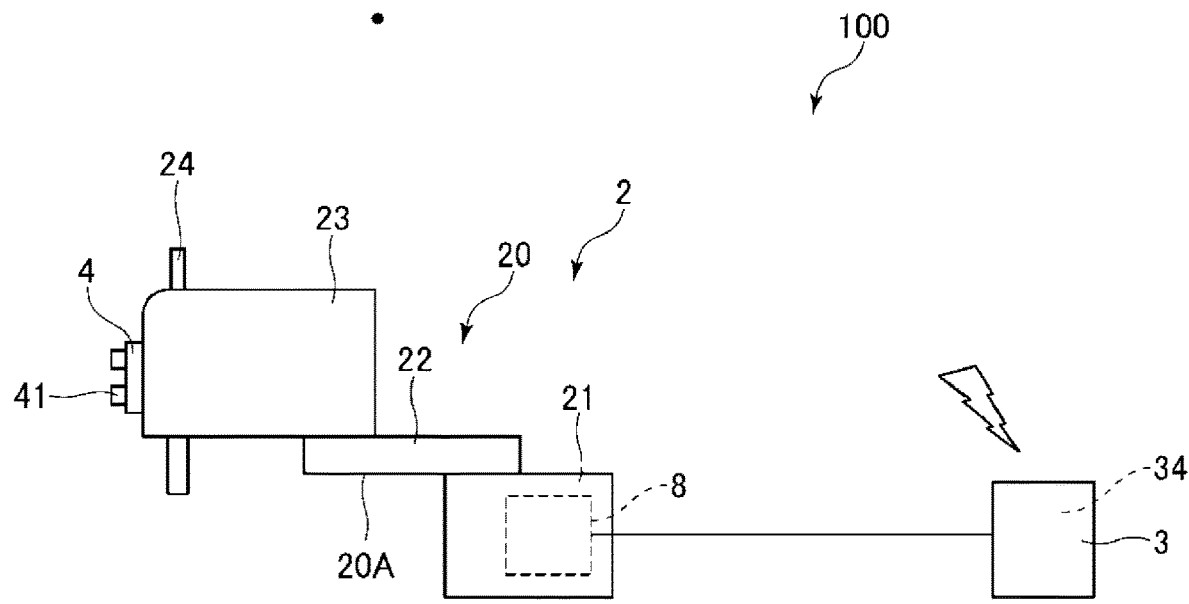
Figure 2:
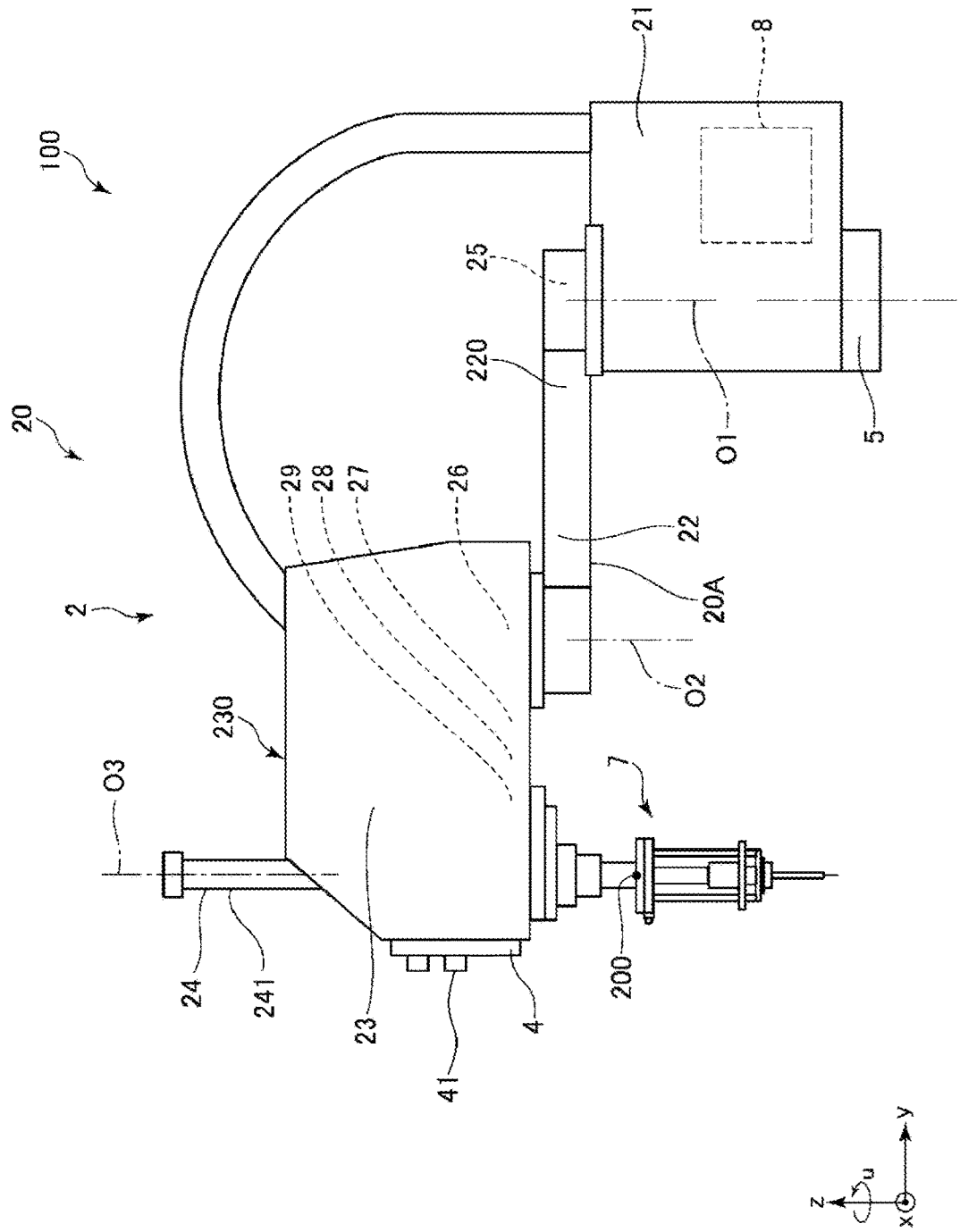
FIG. 2 is a side view of a robot provided in the robot system shown in FIG. 1.
Figure 3:
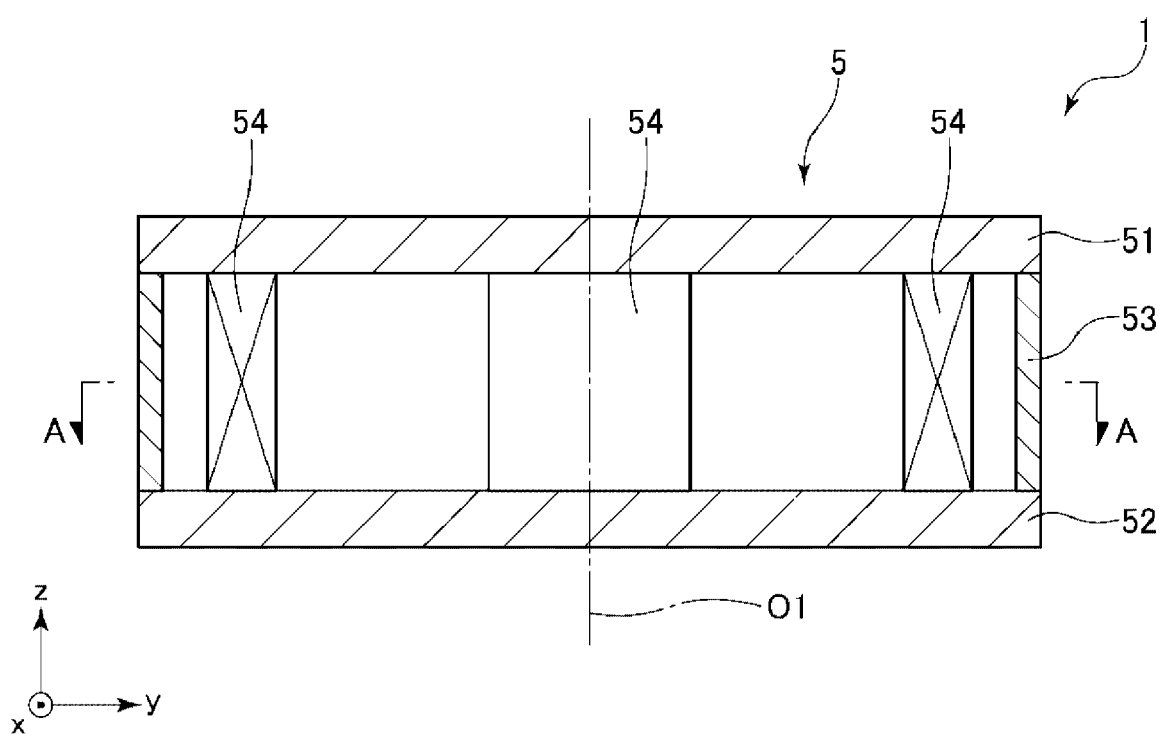
FIG. 3 is a longitudinal sectional view of a force detection unit provided in the robot shown in FIG. 1.
Figure 4:
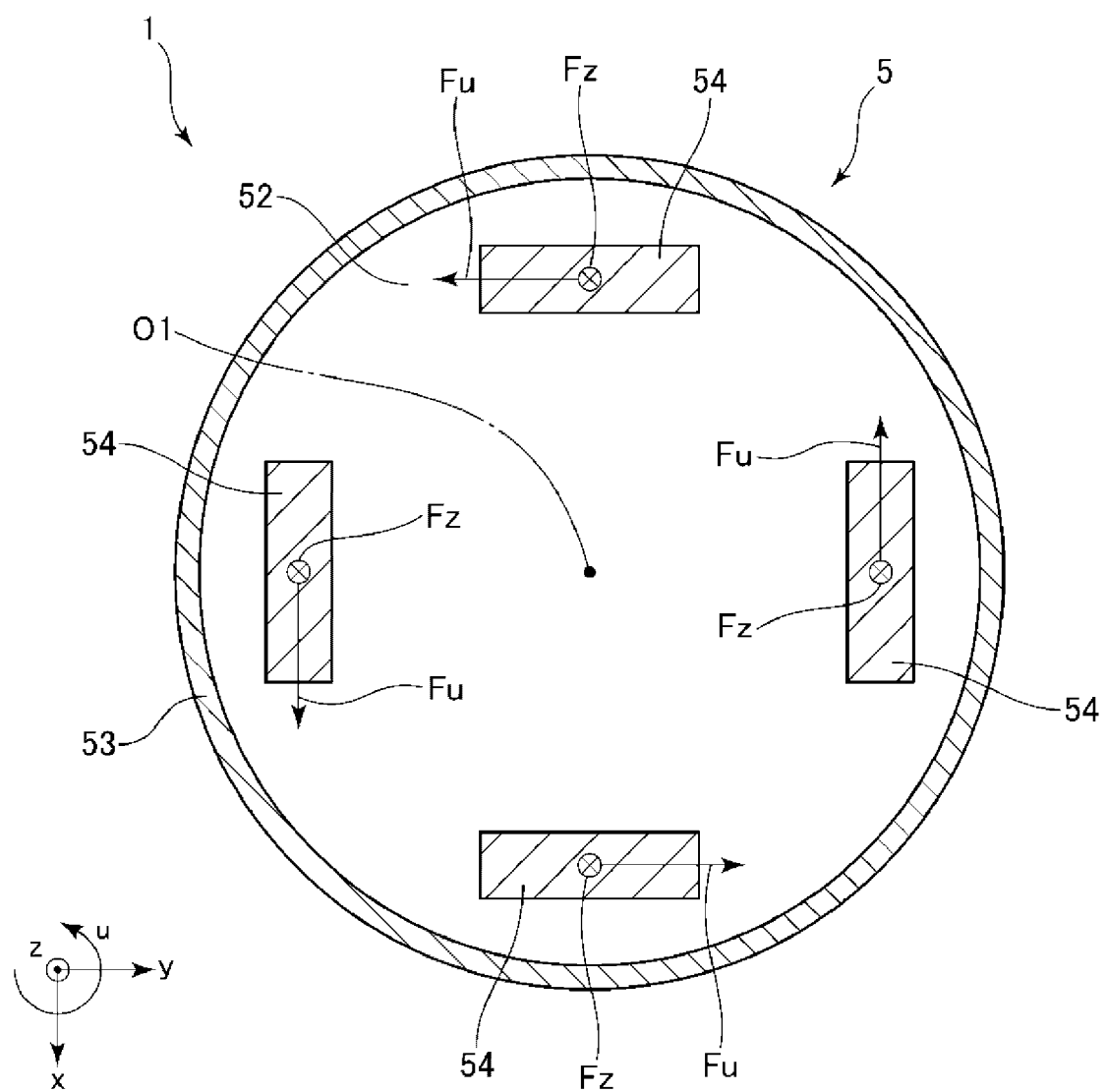
FIG. 4 is a sectional view along line A-A in FIG. 3.
Figure 5:
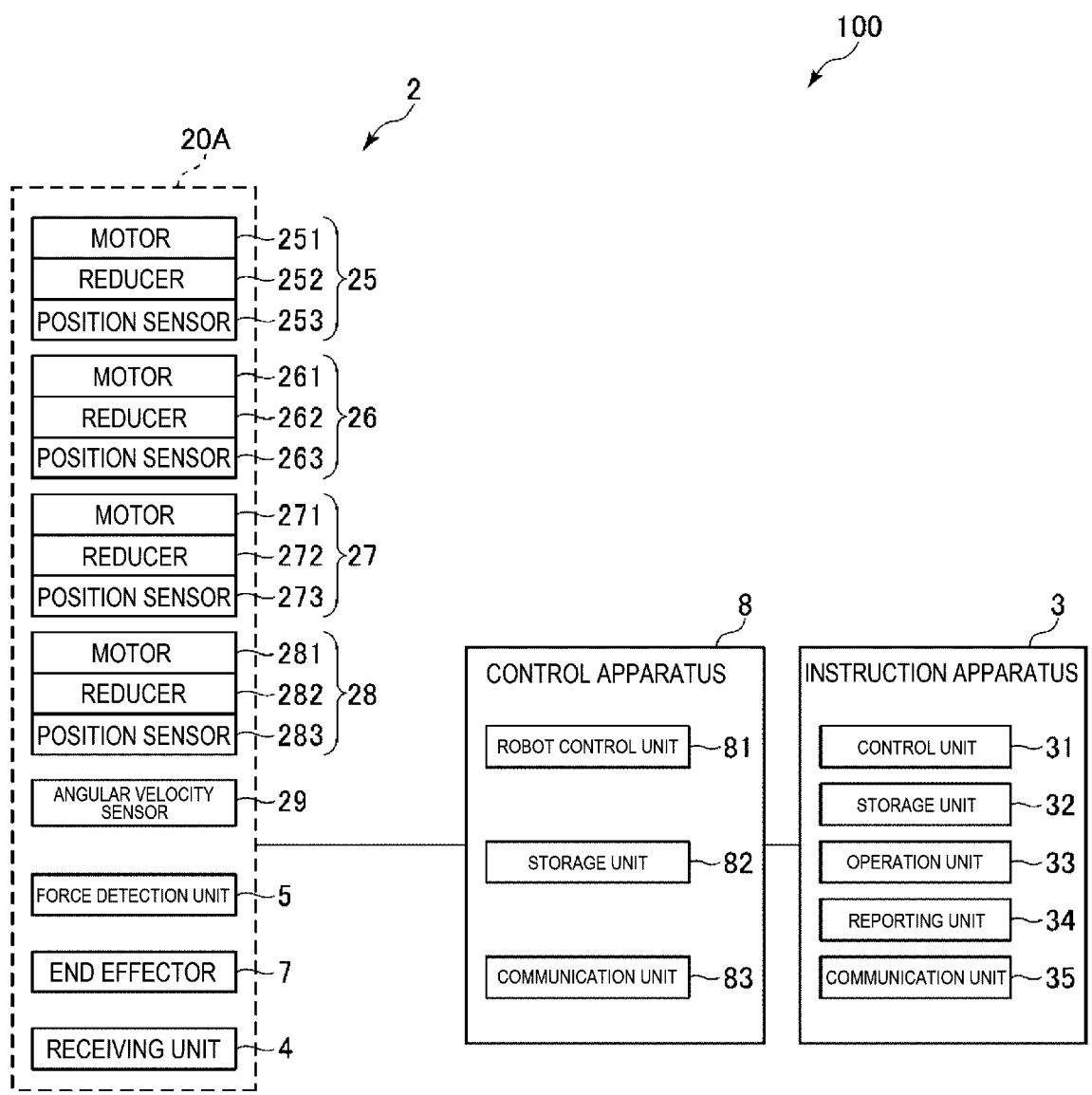
FIG. 5 is a functional block diagram of the robot system shown in FIG. 1.
Figure 6:
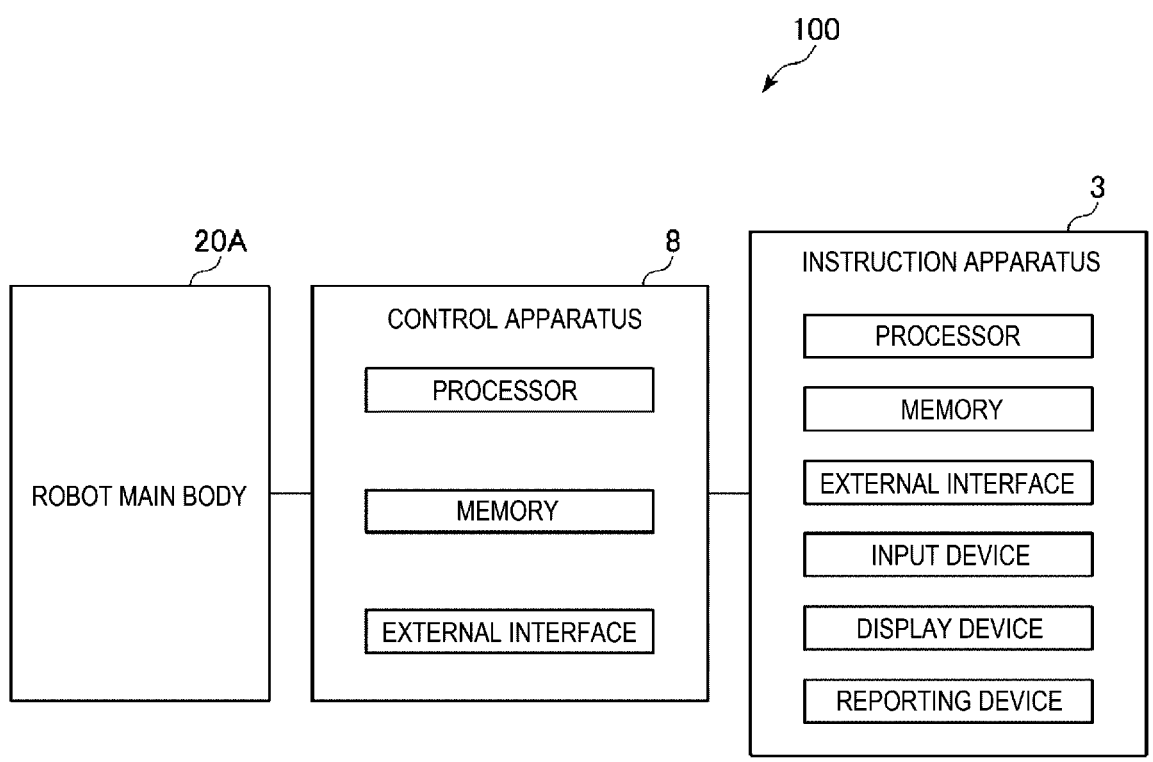
FIG. 6 is a block diagram showing a hardware configuration example of the robot system shown in FIG. 5.

FIG. 1 is the schematic configuration diagram of the first embodiment of the robot system according to the present disclosure. FIG. 2 is the side view of the robot provided in the robot system shown in FIG. 1. FIG. 3 is the longitudinal sectional view of the force detection unit provided in the robot shown in FIG. 1. FIG. 4 is the sectional view along line A-A in FIG. 3. FIG. 5 is the functional block diagram of the robot system shown in FIG. 1. FIG. 6 is the block diagram showing the hardware configuration example of the robot system shown in FIG. 5.

In FIG. 2, for convenience of explanation, an x-axis, a y-axis, and a z-axis are shown as three axes orthogonal to one another. Hereinafter, directions parallel to the x-axis are also referred to as "x-axis directions", directions parallel to the y-axis are also referred to as "y-axis directions", and directions parallel to the z-axis are also referred to as "z-axis directions". Further, hereinafter, the pointer sides of the respective arrows in the drawings are referred to as "+ (plus)" and the tail sides are referred to as "− (minus)", the direction parallel to the +x-axis direction is also referred to as "+x-axis direction", the direction parallel to the −x-axis direction is also referred to as "−x-axis direction", the direction parallel to the +y-axis direction is also referred to as "+y-axis direction", the direction parallel to the −y-axis direction is also referred to as "−y-axis direction", the direction parallel to the +z-axis direction is also referred to as "+z-axis direction", and the direction parallel to the −z-axis direction is also referred to as "−z-axis direction". Further, directions about the z-axis and directions about an axis parallel to the z-axis are also referred to as "u-axis directions".

Hereinafter, for convenience of explanation, the +z-axis direction, i.e., the upside in FIG. 2 is also referred to as "upper" or "above" and the −z-axis direction, i.e., the downside is also referred to as "lower" or "below". Further, with respect to a robot arm 20, a base 21 side in FIGS. 1 and 2 is referred to as "proximal end" and the opposite side, i.e., an end effector 7 side is referred to as "distal end". Furthermore, the z-axis directions, i.e., upward and downward directions in FIG. 1 are referred to as "vertical directions" and the x-axis directions and the y-axis directions, i.e., leftward and rightward directions are referred to as "horizontal directions".

A robot system 100 shown in FIG. 1 is used for work of e.g. holding, transport, assembly, inspection, etc. of works including electronic components and electronic apparatuses.

The robot system 100 includes a robot 2 and an instruction apparatus 3 that instructs the robot 2 to execute an operation program. The robot 2 and the instruction apparatus 3 can communicate via wired or wireless connection and the communication may be made via a network such as the Internet.

The robot 2 is a horizontal articulated robot, i.e., a scalar robot in the configuration shown in FIG. 2. As shown in FIG. 1, the robot 2 includes a base 21, a robot arm 20 coupled to the base 21, a receiving unit 4 that receives a predetermined operation from an operator, a force detection unit 5, an end effector 7, and a control apparatus 8 that controls actuation of these respective units. The robot arm 20, the base 21, the receiving unit 4, and the force detection unit 5 form a robot main body 20A.

The robot arm 20 includes a first arm 22, a second arm 23, and a third arm 24 as a working head.

Note that the robot 2 is not limited to the illustrated configuration, but the number of arms may be one, two, four, or more.

Further, the robot 2 includes a drive unit 25 that rotates the first arm 22 relative to the base 21, a drive unit 26 that rotates the second arm 23 relative to the first arm 22, a u-drive unit 27 that rotates a shaft 241 of the third arm 24 relative to the second arm 23, a z-drive unit 28 that moves the shaft 241 in the z-axis directions relative to the second arm 23, and an angular velocity sensor 29.

As shown in FIGS. 2 and 5, the drive unit 25 is provided inside of a housing 220 of the first arm 22 and has a motor 251 that generates a drive force, a reducer 252 that reduces the drive force of the motor 251, and a position sensor 253 that detects the rotation angle of the rotation shaft of the motor 251 or the reducer 252.

The drive unit 26 is provided inside of a housing 230 of the second arm 23 and has a motor 261 that generates a drive force, a reducer 262 that reduces the drive force of the motor 261, and a position sensor 263 that detects the rotation angle of the rotation shaft of the motor 261 or the reducer 262.

The u-drive unit 27 is provided inside of the housing 230 of the second arm 23 and has a motor 271 that generates a drive force, a reducer 272 that reduces the drive force of the motor 271, and a position sensor 273 that detects the rotation angle of the rotation shaft of the motor 271 or the reducer 272.

The z-drive unit 28 is provided inside of the housing 230 of the second arm 23 and has a motor 281 that generates a drive force, a reducer 282 that reduces the drive force of the motor 281, and a position sensor 283 that detects the rotation angle of the rotation shaft of the motor 281 or the reducer 282.

As the motor 251, the motor 261, the motor 271, and the motor 281, e.g. servo motors such as AC servo motors or DC servo motors may be used.

As the reducer 252, the reducer 262, the reducer 272, and the reducer 282, e.g. planet gear reducers, wave gearings, or the like may be used. Further, as the position sensor 253, the position sensor 263, the position sensor 273, and the position sensor 283, e.g. angle sensors may be used.

The drive unit 25, the drive unit 26, the u-drive unit 27, and the z-drive unit 28 are respectively coupled to corresponding motor drivers (not shown) and controlled by a robot control unit 81 of the control apparatus 8 via the motor drivers.

As shown in FIG. 2, the angular velocity sensor 29 is provided inside of the second arm 23. Accordingly, the sensor may detect the angular velocity of the second arm 23.

The control apparatus 8 performs control of the robot 2 based on information of the detected angular velocity.

The base 21 is fixed to a floor surface (not shown) by bolts or the like. The first arm 22 is coupled to the upper end portion of the base 21. The first arm 22 is rotatable about a first axis O1 along the vertical directions relative to the base 21. When the drive unit 25 that rotates the first arm 22 drives, the first arm 22 rotates within a horizontal plane about the first axis O1 relative to the base 21. The position sensor 253 is configured to detect the amount of rotation of the first arm 22 relative to the base 21.

The second arm 23 is coupled to the distal end portion of the first arm 22. The second arm 23 is rotatable about a second axis O2 along the vertical directions relative to the first arm 22. The axial direction of the first axis O1 is the same as the axial direction of the second axis O2. That is, the second axis O2 is parallel to the first axis O1. When the drive unit 26 that rotates the second arm 23 drives, the second arm 23 rotates within a horizontal plane about the second axis O2 relative to the first arm 22. The position sensor 263 is configured to detect the amount of drive, i.e., the amount of rotation of the second arm 23 relative to the first arm 22.

The third arm 24 is placed and supported in the distal end portion of the second arm 23. The third arm 24 has the shaft 241. The shaft 241 is rotatable about a third axis O3 along the vertical directions relative to the second arm 23 and movable in the upward and downward directions. The shaft 241 is the arm at the most distal end of the robot arm 20.

When the u-drive unit 27 that rotates the shaft 241 drives, the shaft 241 rotates about the z-axis. Further, the position sensor 273 is configured to detect the amount of rotation of the shaft 241 relative to the second arm 23.

When the z-drive unit 28 that moves the shaft 241 in the z-axis directions drives, the shaft 241 moves in the upward and downward directions, i.e., in the z-axis directions. Further, the position sensor 283 is configured to detect the amount of movement of the shaft 241 in the z-axis directions relative to the second arm 23.

As described above, the robot arm 20 has the first arm 22, the second arm 23 coupled to the first arm 22 at the opposite side to the base 21 and pivoting about the second axis O2 parallel to the first axis O1, and the third arm 24 supported by the second arm 23 and moving along the axial direction of the third axis O3 in a different position from the second axis O2 and parallel to the second axis O2. The movable range in the xy plane may be sufficiently secured by the first arm 22 and the second arm 23, and the robot arm may be also actuated in the z-axis directions by the third arm 24.

In the robot 2, with the distal end of the shaft 241 as a control point, a distal end coordinate system having the origin at the control point is set. The distal end coordinate system and a robot coordinate system with reference to the origin set in the base 21 were calibrated and coordinates in the distal end coordinate system may be obtained from coordinates in the robot coordinate system by calculation.

Note that the control point may be set at the distal end of the end effector 7.

Further, various end effectors are detachably coupled to the distal end portion of the shaft 241. The end effector is not particularly limited to, but includes e.g. one that grips an object to be transported, one that processes an object to be processed, and one used for inspection. In the embodiment, the end effector 7 is detachably coupled.

The end effector 7 is not a component element of the robot 2 in the embodiment, however, a part or entire of the end effector 7 may be a component element of the robot 2. Or, the end effector 7 is not a component element of the robot arm 20 in the embodiment, however, a part or entire of the end effector 7 may be a component element of the robot arm 20.

As shown in FIGS. 2 to 4, the force detection unit 5 detects a force applied to the robot 2, i.e., a force applied to the robot arm 20 and the base 21. The force detection unit 5 is provided at the downside of the base 21, i.e., the −z-axis side and supports the base 21 from the downside.

Further, as shown in FIG. 3, the force detection unit 5 is a member having a first plate 51, a second plate 52, a tubular portion 53 placed between the first plate 51 and the second plate 52, a plurality of, in the embodiment, four elements 54, and a columnar outer shape. Further, the four elements 54 are sandwiched between the first plate 51 and the second plate 52. The number of the elements 54 is not limited to that, but may be three or less, five, or more.

The first plate 51 and the second plate 52 have circular plate shapes and placed apart sequentially from the +z-axis side. Note that the shapes of the first plate 51 and the second plate 52 in the plan view may be any shapes, not limited to the circular shapes.

In the embodiment, the tubular portion 53 has a cylinder shape and a function of protecting the elements 54.

The respective elements 54 are placed to form a circular shape at equal intervals. Thereby, the forces applied to the respective elements 54 are as uniform as possible and the forces may be accurately detected.

As each element 54, e.g. an element formed using a piezoelectric material such as quartz crystal and outputting electric charge when subjected to an external force may be used. The control apparatus 8 may perform conversion into an external force applied to the end effector 7 according to the amounts of electric charge. Further, such a piezoelectric material can adjust the direction in which the electric charge may be generated when the material is subjected to the external force according to the direction in which the material is placed.

In the embodiment, as shown in FIG. 4, each element 54 may detect a force Fz as a component in the vertical direction and a force Fu about the z-axis, i.e., in the u-axis direction. That is, the force detection unit 5 detects the force Fz in the axial direction of the third axis O3. Thereby, the work of moving the shaft 241 along the z-axis directions may be performed more accurately.

As shown in FIG. 2, the receiving unit 4 is provided in the distal end portion of the robot arm 20, i.e., at the −y-axis side of the second arm 23. Specifically, the receiving unit 4 is placed on the outer surface of the housing 230 of the second arm 23 to face the −y-axis side.

Further, the receiving unit 4 is a part that receives a predetermined operation by the operator. In the embodiment, the receiving unit 4 includes a switch and is formed by an operation button 41 as an example. In this case, the predetermined operation performed by the operator is an action of pressing. The operation button 41 may be a mechanical button or touch-electric button.

Or, a button having a different function such as a button for teaching may be placed around the operation button 41.

The switch is not limited to the above described buttons, but a toggle switch, rocker switch, rotary switch, slide switch, or the like may be used.

As described above, the robot main body 20A has the robot arm 20 and the receiving unit 4 is the operation button 41 as the switch provided in the robot arm 20. Thereby, for example, the operator near the robot arm 20 during teaching or the like or operating the robot arm 20 may easily perform operation of the receiving unit 4.

Further, the receiving unit 4 is not limited to the above described switches, but an optical or capacitive proximity sensor may be used and may receive operation when the operator approaches at a predetermined distance.

When the operator applies an external force to a predetermined part of the robot arm 20, the force detection unit 5 may detect the received force and receive the operation. In this case, the force detection unit 5 functions as the receiving unit 4. "Predetermined operation" in this case includes pushing, pulling, tapping of the robot arm 20 by the operator.

Next, the control apparatus 8 will be explained.

As shown in FIGS. 1 and 2, the control apparatus 8 is provided inside of the base 21 in the embodiment. Further, as shown in FIG. 5, the control apparatus 8 has a function of controlling driving of the robot 2 and is electrically coupled to the above described respective parts of the robot 2. The control apparatus 8 includes the robot control unit 81, a storage unit 82, and a communication unit 83. These respective units are coupled communicably with one another.

The robot control unit 81 executes various programs etc. stored in the storage unit 82. Thereby, processing including control of driving of the robot 2, various calculations, and various determinations is realized.

The storage unit 82 stores operation programs executed by the robot control unit 81. The programs are prepared with respect to each work and stored to be updatable as needed. Further, the storage unit 82 may be configured to store other data than the programs. The other data than the programs includes e.g. setting information and maintenance history of the control apparatus 8.

The communication unit 83 performs communication between the control apparatus 8 and the corresponding robot main body 20A and communication between the control apparatus 8 and the instruction apparatus 3. Further, the communication unit 83 functions as a transmitting unit that, when the receiving unit 4 receives the operation, transmits information representing reception of the operation.

The function of the control apparatus 8 can be realized by e.g. a hardware configuration shown in FIG. 6.

The control apparatus 8 shown in FIG. 6 includes a processor, a memory, and an external interface communicably coupled to one another.

The processor shown in FIG. 6 includes e.g. a CPU (Central Processing Unit).

The memory shown in FIG. 6 includes e.g. a volatile memory such as a RAM (Random Access Memory), non-volatile memory such as a ROM (Read Only Memory), etc. Note that the memory is not limited to the undetachable type but may be a detachable external memory device.

The external interface shown in FIG. 6 includes various connectors for communication. A USB (Universal Serial Bus) connector, RS-232C connector, and wired LAN (Local Area Network) are examples. Or, the external interface may be a transceiver that enables wireless communication such as a wireless LAN.

Or, the control apparatus 8 may further include another hardware component element in addition to the above described component elements.

Next, the instruction apparatus 3 will be explained.

As shown in FIG. 5, the instruction apparatus 3 instructs the robot 2 to execute an operation program and instructs the robot 2 to perform an operation. Then, the control apparatus 8 of the robot 2 controls driving of the respective parts of the robot 2 based on the instruction. The instruction apparatus 3 has a control unit 31, a storage unit 32, an operation unit 33, a reporting unit 34 as a first reporting unit, and a communication unit 35. These respective units are communicably coupled to one another. The instruction apparatus 3 includes an operation apparatus that can be operated and used by the user.

The control unit 31 controls actuation of the operation unit 33 and the reporting unit 34 based on various programs stored in the storage unit 32.

The storage unit 32 stores programs to be executed by the control unit 31, operation programs to be executed by the control apparatus 8, etc. These programs are prepared with respect to each work and stored to be updatable as needed. Further, the storage unit 32 may be configured to store other data than the programs. The other data than the programs includes e.g. setting information and maintenance history of the control apparatus 8.

The operator performs a predetermined operation on the operation unit 33 and the unit receives the instruction from the operator. Further, the operation unit 33 displays various windows when the operator inputs information to the instruction apparatus 3.

The reporting unit 34 reports to the operator.

The communication unit 35 communicates with the control apparatus 8. That is, the communication unit 35 also functions as a receiving unit that receives information transmitted by the communication unit 83. The function will be described in detail later.

The function of the instruction apparatus 3 can be realized by e.g. a hardware configuration shown in FIG. 6.

The instruction apparatus 3 shown in FIG. 6 includes a processor, a memory, and an external interface communicably coupled to one another.

The processor shown in FIG. 6 includes e.g. a CPU (Central Processing Unit).

The memory shown in FIG. 6 includes e.g. a volatile memory such as a RAM (Random Access Memory), non-volatile memory such as a ROM (Read Only Memory), etc. Note that the memory is not limited to the undetachable type but may be a detachable external memory device.

The external interface shown in FIG. 6 includes various connectors for communication. A USB (Universal Serial Bus) connector, RS-232C connector, and wired LAN (Local Area Network) are examples. Or, the external interface may be a transceiver that enables wireless communication such as a wireless LAN.

A display device shown in FIG. 6 includes e.g. a liquid crystal monitor and displays various windows. The input device is a device to which the operator performs various kinds of input and includes e.g. a keyboard and a mouse. Or, the screen of the display device may include a touch panel. That is, the display device and the input device may be integrally formed.

A reporting device shown in FIG. 6 may have a visual reporting configuration, auditory reporting configuration, sensory reporting configuration, or a combination of these two or more configurations. In the case of visual reporting, both the reporting device and the display device may be used.

In the case of visual reporting, the reporting device includes a monitor displaying a predetermined character or sign, a blinking pattern, and a lamp emitting different colors of light.

In the case of auditory reporting, the reporting device includes various sounding devices that issue voice, warning sound, or the like.

The instruction apparatus 3 may have a function of teaching or instruct the robot 2 to execute another operation program without teaching. The instruction apparatus 3 may include e.g. a personal computer and teaching pendant.

Further, an apparatus for an instruction uniquely created by the user using a connection interface to the control apparatus 8 may be an example of the instruction apparatus 3.

Or, the instruction apparatus 3 may further include another hardware component element in addition to the above described component elements.

When the connection between the instruction apparatus 3 and the control apparatus 8 is wireless connection, visual recognition of the connection condition between the instruction apparatus 3 and the control apparatus 8 is harder and effects of the present disclosure, which will be described later, may be obtained more remarkably.

Or, when the connection between the instruction apparatus 3 and the control apparatus 8 is wired connection, when a plurality of the instruction apparatuses 3 and a plurality of the robots 2 are located close to one another, the number of wires is larger and visual recognition of the connection condition between the instruction apparatus 3 and the control apparatus 8 is harder at a glance and the effects of the present disclosure to be described later may be obtained more remarkably.

The operator operates the operation unit 33 of the instruction apparatus 3, and thereby, instructs the robot 2 to execute the operation program. The operation program includes e.g. a program on teaching and program on work performed by the robot 2. That is, the operator may set the robot 2 in a teaching mode or work mode using the instruction apparatus 3.

For example, the above described robot system 100 is used in a factory in the following manner. In the configuration shown in FIG. 1, a plurality of the robots 2 are provided and one instruction apparatus 3 is placed for each robot 2. That is, a plurality of the robot systems 100 are present and these are actuated according to the operation program having the same content or different operation programs at the same time or different times.

In this case, it is hard for the operator to know by which instruction apparatus 3 one robot 2 is instructed. In the present disclosure, the problem may be solved in the following manner.

As below, the explanation will be started from an initial state, i.e., a state in which the robot 2 and the instruction apparatus 3 are not coupled. For desired work, when the operator couples the instruction apparatus 3 to the robot 2, that is, when the communication unit 83 of the control apparatus 8 and the communication unit 35 of the instruction apparatus 3 are set to be communicable, information representing individual identification of the coupled instruction apparatus 3 is stored in the storage unit 82. By the coupling, the instruction apparatus 3 reaches a condition with a right for control on the robot 2.

Here, "the condition with the right for control" refers to a condition in which the instruction apparatus can instruct the control apparatus 8 to execute an operation program. Once the instruction apparatus 3 reached the condition with the right for control, even in an offline status, that is, even when the communication between the control apparatus 8 and the instruction apparatus 3 is ceased, the condition with the right for control of the instruction apparatus 3 is continued.

Then, when the operator operates the operation button 41 of the receiving unit 4 of the robot 2, first, information representing that the operation was performed is transmitted to the control apparatus 8. Then, when the control apparatus 8 transmits a report command signal to the instruction apparatus 3 with reference to the information stored in the storage unit 82, i.e., information representing the individual identification of the control apparatus 8 in the condition with the right for control. Then, the instruction apparatus 3 received the report command signal actuates the reporting unit 34 and reports that the instruction apparatus 3 is in the condition with the right for control.

Thereby, the operator near the robot 2 may know the instruction apparatus 3 in the condition with the right for control on the robot 2. Therefore, the operator may operate the instruction apparatus 3 while knowing the robot 2 to perform operation. As a result, safety of the operator is secured.

Or, the reporting unit 34 may be configured to report for a preset time or while the receiving unit 4 is operated.

Note that, when, even when the operator operates the operation button 41 of the receiving unit 4, the corresponding instruction apparatus 3 is not present, the reporting unit 34 may be configured not to report or report that the corresponding instruction apparatus 3 is not present.

When the operator operates the operation button 41 of the receiving unit 4, for example, when the control apparatus 8 and the instruction apparatus 3 are in the offline status, the control apparatus 8 may transmit a signal for returning to the online status. Thereby, the work may be smoothly restarted.

As described above, the robot system 100 according to the present disclosure includes the robot 2 having the robot main body 20A having the receiving unit 4 that receives the predetermined operation, the control apparatus 8 that controls the actuation of the robot main body 20A, and the communication unit 83 as the transmitting unit that transmits information representing reception of the operation when the receiving unit 4 receives the operation, and the instruction apparatus 3 having the communication unit 35 as the receiving unit that receives the information transmitted by the communication unit 83 and the reporting unit 34 as the first reporting unit and instructing the control apparatus 8 to execute the operation program. In the case where the instruction apparatus 3 is in the condition with the right for control as the condition in which the instruction apparatus 3 can instruct the control apparatus 8 to execute the operation program, when the communication unit 35 receives the information, the reporting unit 34 reports that the instruction apparatus 3 is in the condition with the right for control. Thereby, the operator near the robot 2 may know the instruction apparatus 3 in the condition with the right for control on the robot 2. Therefore, the operator may operate the instruction apparatus 3 while knowing the robot 2 to perform the operation. As a result, the safety of the operator is secured.

Second Embodiment

Figure 7:
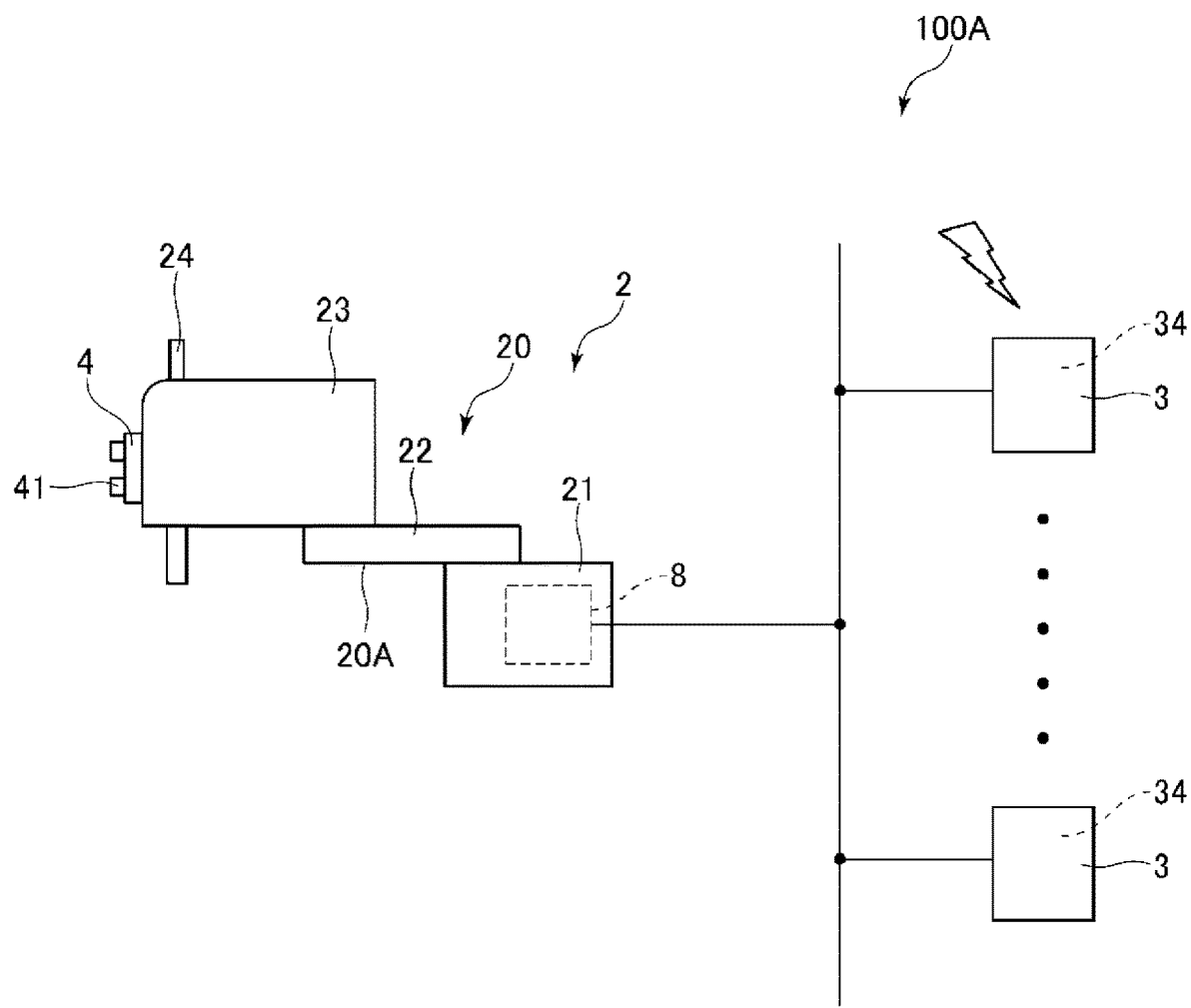
FIG. 7 is a schematic configuration diagram of a second embodiment of the robot system according to the present disclosure.

FIG. 7 is the schematic configuration diagram of the second embodiment of the robot system according to the present disclosure.

As below, the second embodiment will be explained, and the explanation will be made with a focus on differences from the first embodiment and the explanation of the same items will be omitted.

As shown in FIG. 7, a robot system 100A has the robot 2 and a plurality of the instruction apparatuses 3. The robot 2 is respectively communicable with the plurality of instruction apparatuses 3. The respective instruction apparatuses 3 include the apparatuses exemplified in the above described first embodiment and are of different types from one another. Note that the plurality of the instruction apparatuses 3 may include mixture of a plurality of the same type of the apparatuses.

Further, in the embodiment, the plurality of the instruction apparatuses 3 are communicable with the robot 2, however, only one of the instruction apparatuses 3 is in the condition with the right for control. That is, one instruction apparatus of the respective instruction apparatuses 3 instructs the robot 2 to execute the operation program.

Priorities are set with respect to each type of the instruction apparatus 3, and the instruction apparatus 3 to which the right for control is provided is selected based on the priorities. For example, information on the priorities with respect to each type of the instruction apparatus 3 may be stored in the storage unit 82 of the control apparatus 8 in advance, one of the respective instruction apparatuses 3 with confirmed coupling may be selected based on the priorities and input of the operation program may be received only from the instruction apparatus 3.

As described above, the robot system 100A of the embodiment includes the plurality of instruction apparatuses 3. Further, the robot 2 is instructed to execute the operation program by one instruction apparatus 3 of the plurality of instruction apparatuses 3. In this case, it is particularly hard for the operator near the robot 2 to know the instruction apparatus 3 in the condition with the right for control on the robot 2. Therefore, under the situation, the effects of the present disclosure may be obtained more remarkably.

Note that, in the embodiment, the configuration in which only one instruction apparatus 3 is in the condition with the right for control is explained as an example, however, a plurality of instruction apparatuses 3 may be in the condition with the right for control.

Third Embodiment

Figure 8:
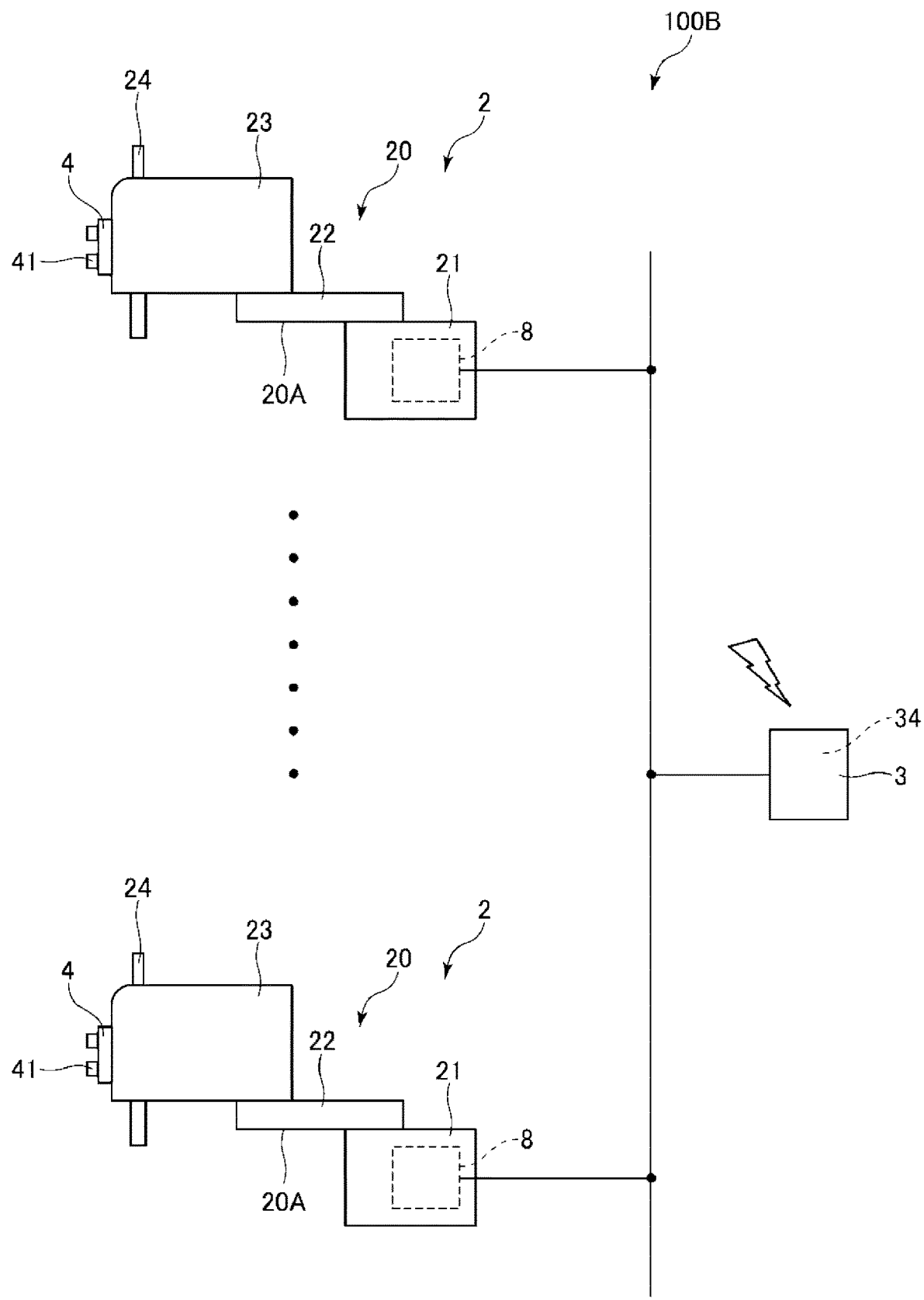
FIG. 8 is a schematic configuration diagram of a third embodiment of the robot system according to the present disclosure.

FIG. 8 is the schematic configuration diagram of the third embodiment of the robot system according to the present disclosure.

As below, the third embodiment will be explained, and the explanation will be made with a focus on differences from the first embodiment and the explanation of the same items will be omitted.

As shown in FIG. 8, a robot system 100B has a plurality of the robots 2 and the instruction apparatus 3. The instruction apparatus 3 is respectively communicable with the respective robots 2. The respective robots 2 may be of the same type or different types of robots may be mixed.

Further, in the embodiment, the instruction apparatus 3 is communicable with the plurality of robots 2, however, the instruction apparatus 3 may be in the condition with the right for control on only one robot 2 or in the condition with the right for control on each of the plurality of robots 2.

As described above, the instruction apparatus 3 may be in the condition with the right for control on the plurality of robots 2. In this case, it is particularly hard for the operator near the robot 2 to know the instruction apparatus 3 in the condition with the right for control on the robot 2. Therefore, under the situation, the effects of the present disclosure may be obtained more remarkably.

Fourth Embodiment

Figure 9:
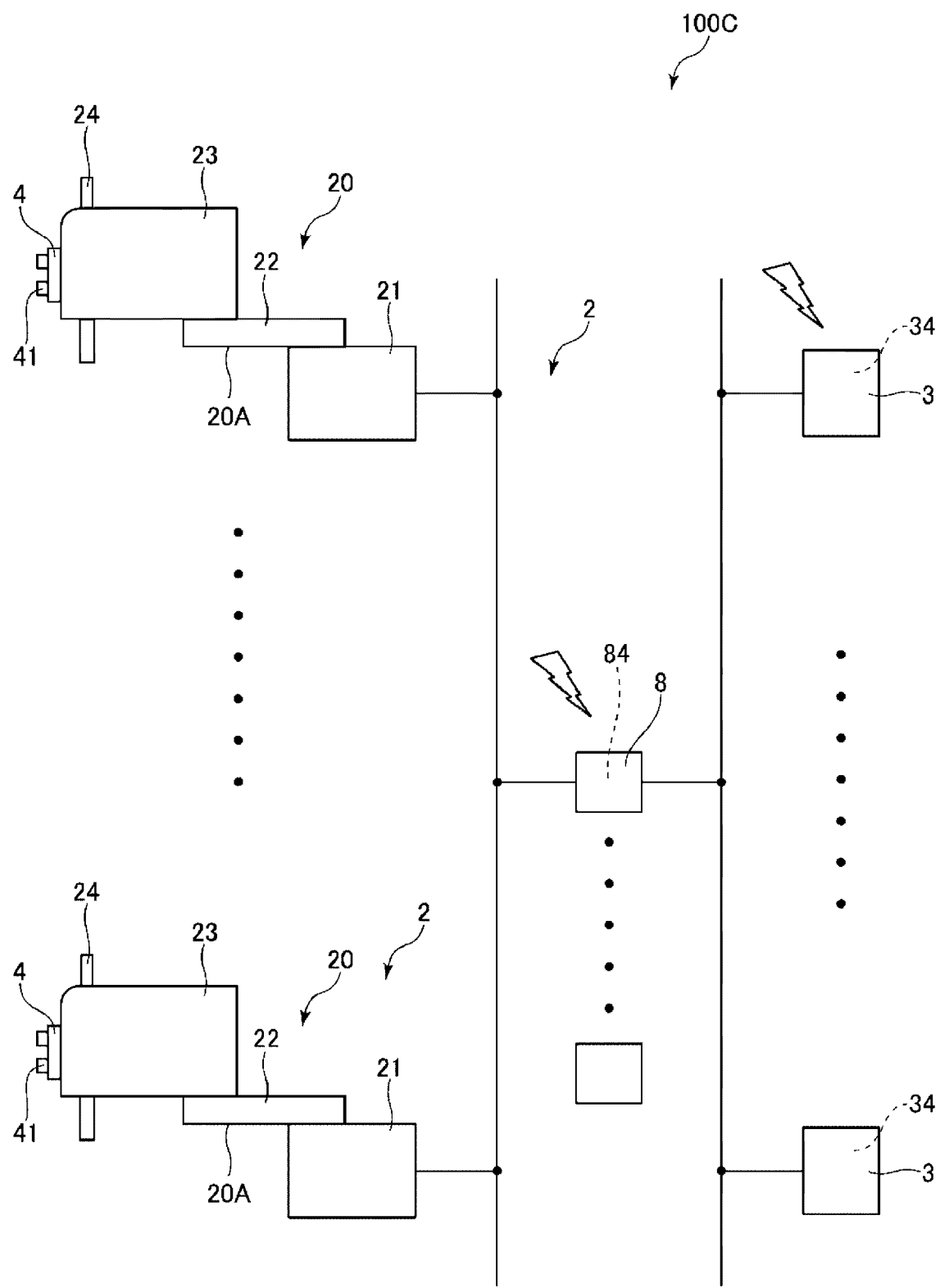
FIG. 9 is a schematic configuration diagram of a fourth embodiment of the robot system according to the present disclosure.

FIG. 9 is the schematic configuration diagram of the fourth embodiment of the robot system according to the present disclosure.

As below, the fourth embodiment will be explained, and the explanation will be made with a focus on differences from the first embodiment and the explanation of the same items will be omitted.

As shown in FIG. 9, the robot 2 of a robot system 100C has a plurality of the robot main bodies 20A and one control apparatus 8. The control apparatus 8 is separately formed from the robot main bodies 20A and has a housing different from the bases 21. The control apparatus 8 is respectively coupled to the plurality of robot main bodies 20A and may independently control the respective robot main bodies 20A at the same time or different times. Further, the control apparatus 8 is configured to couple to a plurality of the instruction apparatuses 3.

Furthermore, the control apparatus 8 has a reporting unit 84 as a second reporting unit. The reporting unit 84 includes one having the configuration exemplified in the reporting device of the first embodiment. When the receiving unit 4 receives the predetermined operation, the reporting unit 34 of the instruction apparatus 3 in the condition with the right for control performs reporting like the above described embodiment. When the control apparatus 8 can control the actuation of the robot main body 20A received the operation, the reporting unit 84 of the control apparatus 8 performs reporting thereon. Thereby, as shown in FIG. 9, in an environment in which a plurality of the control apparatuses 8 are present, by which control apparatus 8 the robot main body 20A performed the operation on the receiving unit 4 is controlled may be known at a glance.

As described above, in the embodiment, the robot 2 has the plurality of robot main bodies 20A. Further, the control apparatus 8 is separately formed from the plurality of robot main bodies 20A and respectively independently controls the actuation of the plurality of robot main bodies 20A, i.e., the actuation of the robot main bodies 20A. According to the configuration, compared to a case where one control apparatus 8 is coupled to one robot main body 20A, the number of control apparatuses 8 may be reduced. Therefore, the coupling status may be known more easily.

Furthermore, the control apparatus 8 has the reporting unit 84 as the second reporting unit. In the case where the control apparatus 8 can control the actuation of the robot main bodies 20A, when the receiving unit 4 receives the operation, the reporting unit 84 reports that the control apparatus 8 can control the actuation of the robot main body 20A. Thereby, in addition to the effects of the present disclosure, by which control apparatus 8 the robot main body 20A performed the operation on the receiving unit 4 is controlled may be known at a glance.

As above, the robot system according to the present disclosure is explained based on the illustrated embodiments, however, the present disclosure is not limited to those. The configurations of the respective parts may be replaced by arbitrary configurations having the same functions. Further, other arbitrary configurations may be added to the above described embodiments of the robot system. Furthermore, the robot system according to the present disclosure may be formed by a combination of the features of the above described embodiments.

What is claimed is:

1. A robot system comprising:
a robot including a robot main body having a receiving unit that receives a predetermined operation, a control apparatus that controls actuation of the robot main body, and a transmitting unit that, when the receiving unit receives the operation, transmits information representing reception of the operation; and
an instruction apparatus having a communication unit that receives the information transmitted by the transmitting unit and a first reporting unit, and instructing the control apparatus to execute an operation program, wherein
when the instruction apparatus is in a condition in which it is able to instruct the control apparatus to execute the operation program, named with right for control, when the communication unit receives the information, the first reporting unit reports that the instruction apparatus is in the condition with the right for control,
the control apparatus has a second reporting unit, and when the control apparatus is able to control actuation of the robot main body, when the receiving unit receives the operation, the second reporting unit reports that the control apparatus is able to control the actuation of the robot main body,
wherein the control apparatus and the instruction apparatus are set to be communicable, information representing individual identification of the coupled instruction apparatus is stored in the control apparatus, and the condition with the right for control of the instruction apparatus is continued even the communication between the control apparatus and the instruction apparatus is ceased.

2. The robot system according to claim 1, wherein the robot and the instruction apparatus are communicatively couplable so that the instruction apparatus is adapted to reach the condition with the right for control on a plurality of the robots.

3. The robot system according to claim 1, further comprising a plurality of the instruction apparatuses, wherein the robot is instructed to execute the operation program from one of the plurality of instruction apparatuses.

4. The robot system according to claim 1, wherein the robot has a plurality of the robot main bodies, and the control apparatus is formed separately from the plurality of robot main bodies and independently controls actuation of the plurality of robot main bodies.

5. The robot system according to claim 1, wherein the robot main body has a robot arm, and the receiving unit is a switch provided in the robot arm.

6. The robot system according to claim 1, wherein the receiving unit is a force detection unit.

* * * * *